United States Patent
Stamm et al.

Patent Number: 5,494,591
Date of Patent: Feb. 27, 1996

[54] CLEANING OF DEPOSIT FILTERS

[75] Inventors: Hans P. Stamm, Bättwil; Kurt Meuli, Frenkendorf, both of Switzerland

[73] Assignee: Christ AG, Aesch, Switzerland

[21] Appl. No.: 412,211

[22] Filed: Mar. 27, 1995

Related U.S. Application Data

[63] Continuation of Ser. No. 99,127, Jul. 29, 1993, abandoned.

[30] Foreign Application Priority Data

Jul. 30, 1992 [CH] Switzerland ............... 2404/92

[51] Int. Cl.$^6$ ............... B01D 25/32; B01D 29/62; B01D 29/66; B01D 41/00
[52] U.S. Cl. ............... 210/797; 210/791; 210/798; 134/22.18; 134/34; 134/37
[58] Field of Search ............... 210/793, 797, 210/798, 791; 134/22.12, 22.18, 34, 37

[56] References Cited

U.S. PATENT DOCUMENTS

| | | | |
|---|---|---|---|
| 5,017,241 | 5/1991 | Ryan | 210/791 |
| 5,114,596 | 5/1992 | Laterra | 210/798 |

FOREIGN PATENT DOCUMENTS

| | | | |
|---|---|---|---|
| 140603 | 7/1900 | Germany. | |
| 2310038 | 3/1974 | Germany. | |

*Primary Examiner*—John Kim
*Attorney, Agent, or Firm*—Wenderoth, Lind & Ponack

[57] ABSTRACT

In order to clean a deposit filter having filter elements (4) installed in a suspended manner, first, with the plenum (3) filled with flushing medium, the liquid is discharged completely or partially from the filter chamber by way of an emptying line (7) by opening a ventilating line (6) arranged in the uppermost region of the filter chamber (2), then, by means of a pressure-generating line (8) which is arranged on the plenum and by way of which propellent gas or flushing medium under pressure is conveyed into the plenum, a pressure surge is generated in the plenum and drives the flushing medium through the filter elements, and finally the impurities, together with the liquid, are discharged. Before the pressure surge is exerted, an underpressure can be generated in the filter chamber, in order further to increase the effect. If desired, the filter elements (4) can have an upper gas-impermeable region (5).

This method allows a simple and extremely effective cleaning and necessitates only slight changes to the apparatus on deposit filters which are cleaned according to the state of the art.

13 Claims, 1 Drawing Sheet

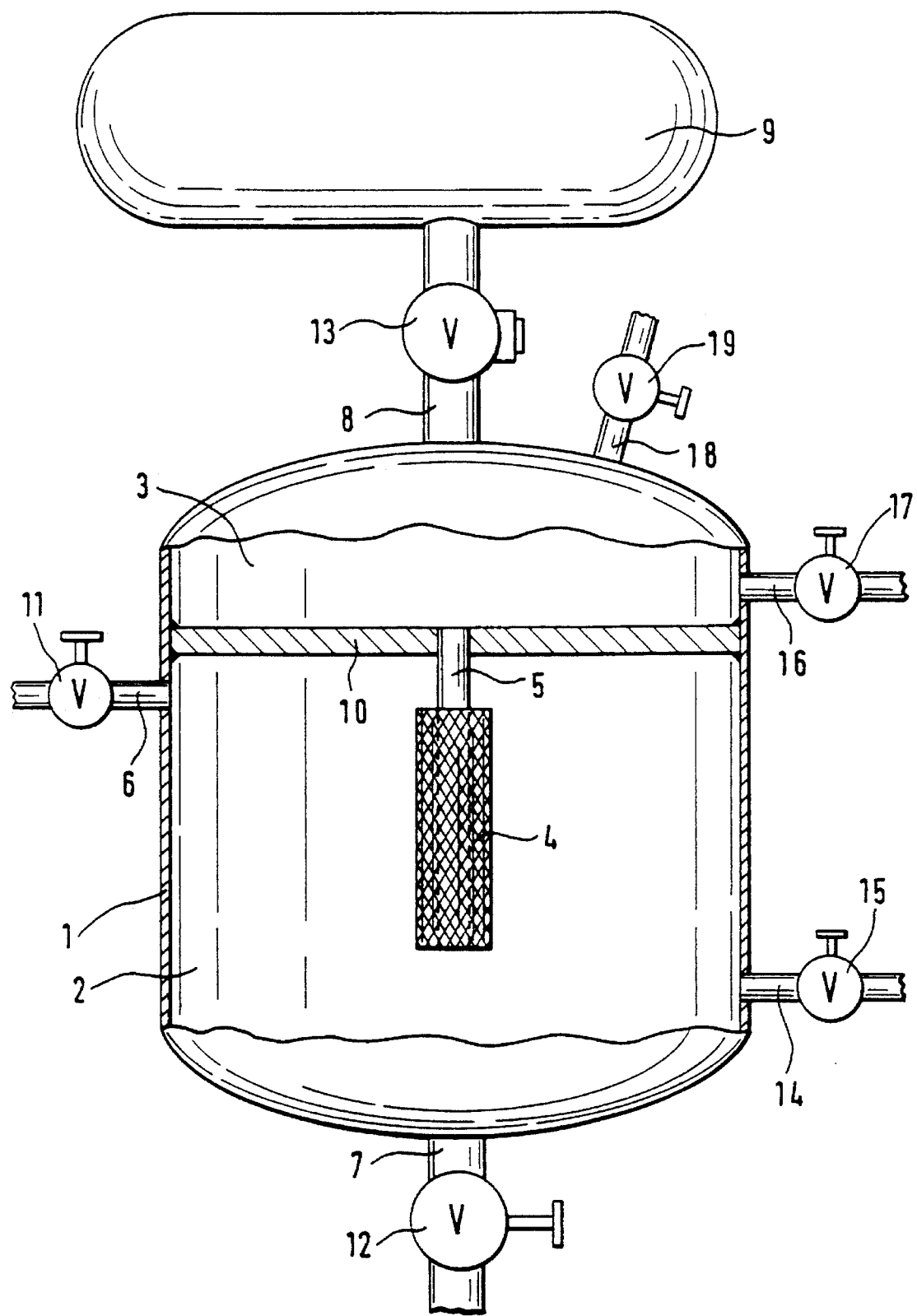

CLEANING OF DEPOSIT FILTERS

This application is a continuation of now abandoned application Ser. No. 08/099,127 filed Jul. 29, 1993.

The invention relates to a new process for the cleaning of deposit filters having filter elements installed in a suspended manner and to a deposit filter suitable for this purpose.

Deposit filters are used particularly for the treatment of relatively large streams of liquid, such as, for example, for cleaning the condensates of steam-generating plants.

After a work cycle of a deposit filter has ended, it is important, each time, to clean off the deposit promoter, together with the filter cake formed during the work cycle, as completely and as uniformly as possible. As a result, on the one hand the filter capacity per work cycle can be kept high, and on the other hand, during the subsequent deposition, the new deposit promoter can be applied uniformly to the cleaned filter substrate.

Most deposit filters consist of upright, usually cylindrical pressure vessels having diameters and cylindrical heights of approximately 0.5 to 3 m and filter elements installed in them in a vertical arrangement. The latter form the substrate for the deposition, that is to say they form the filter medium, on which the filter cake and, where appropriate, the deposition promoter are built up. Most often, cylindrical filter elements having diameters of approximately 20 to 60 mm and lengths of approximately 0.5 to 2 m are used. They must have sufficient tensile and compressive strengths and sufficient permeability for liquids and can, for example, be formed from porous metals, porous ceramic materials or fabric materials or be designed as wound elements composed of plastic or textile fibres.

The filter vessel is respectively subdivided by a horizontal filter plate, into which the filter elements are installed, into the dirt space (filter chamber) and the clean space (plenum). The expression "filter plate" denotes, within the scope of the present invention, a plate having orifices for fastening the filter elements, which sealingly closes the filter chamber relative to the plenum, with the exception of the said orifices. A distinction must be made, here, between two fundamentally possible arrangements, namely deposit filters having filter elements installed in a "suspended" manner and those having filter elements installed in an "upright" manner.

Where filter elements installed in the suspended manner are concerned, the filter plate is installed in the upper part of the filter vessel; the dirt space is at the bottom and the clean space is at the top. For filtration, the liquid to be filtered flows into the dirt space at the bottom, and the filtrate leaves the filter vessel at the top by way of a flow-off line arranged on the clean space.

In contrast, in deposit filters and filter elements installed upright, the filter plate is installed in the lower part of the filter vessel; the dirt space is at the top and the clean space is at the bottom. For filtration, the liquid to be filtered is conveyed into the dirt space at the top, and the filtrate is extracted at the bottom by way of a line arranged on the clean space.

Apart from the differing access to the filter elements and therefore the possibility of installing and dismounting them, the two arrangements also differ substantially in their deposition capacity and their reverse-flow capacity. Deposit filters having filter elements installed in a suspended manner are capable of more uniform deposition, but those with upright filter elements clean more effectively by reverse flow.

According to the customary methods for cleaning the deposit filters having suspended filter elements, the flushing medium present in the clean space or introduced into the clean space by way of a feed line is conveyed through the filter elements rearwards in the direction opposite to the filter direction and is discharged, together with the impurities and the liquid present in the dirt space, by way of an emptying line arranged at the lower end of the filter vessel. The flushing medium is usually the filtrate itself or a liquid having a filtrate-like composition. To improve the cleaning effect, the flow of the flushing liquid is often accelerated by means of compressed air and/or the valve assembly of the emptying line is opened abruptly. The success of this cleaning method nevertheless remains inferior to the cleaning effect of upright filter elements.

Filter elements installed upright can be cleaned better, because, in this arrangement, the hydraulic preconditions for this are fundamentally more favourable. In particular, it is possible to use virtually all the available energy for driving the flushing medium through the filter elements.

In contrast, in the customary cleaning methods for deposit filters having filter elements installed in a suspended manner, a large part of the energy is needed to accelerate the large quantity of liquid in the dirt space, and a further loss occurs as a result of the flow resistance in the emptying valve assembly. Consequently, only a relatively small part of the energy employed can be utilized to accelerate the flushing medium, and the cleaning effect, which depends above all on the product of the speed and of the mass of the flushing medium, is consequently considerably lower.

U.S. Pat. No. 5,017,241 proposed a method for cleaning deposit filters having filter elements installed in a suspended manner, by means of which such losses can be partially avoided. According to this proposal, the filter elements are designed at their upper ends located in the plenum (clean space), in such a way that liquid can be drained off from the lower filter chamber (dirt space), without the liquid present in the clean space at the same time flowing after it completely.

According to this proposal, cleaning can take place in that, first, the liquid is drained off from the filter chamber by opening a ventilating line arranged at the top on the plenum and the emptying line arranged at the bottom on the filter vessel, and a specific quantity of flushing medium defined by the design of the "water lock" is introduced in the plenum. Subsequently, an overpressure is built up in the filter chamber and in the plenum by means of compressed air which is introduced into the filter chamber which can flow into the plenum by way of the filter elements. By closing the compressed-air supply and quickly opening the emptying line and an air-bleed line arranged on the filter chamber, the same pressure difference is then generated between the plenum and filter chamber and drives the flushing medium introduced in the plenum through the filter elements. If desired, this effect can also be assisted by opening a compressed-air feed line arranged on the plenum.

This method affords some improvement in the cleaning of filter elements installed in a suspended manner, since only the quantity of liquid introduced in the plenum has to be accelerated, and therefore a higher speed and consequently a better cleaning effect can be achieved. It nevertheless necessitates some changes to the apparatus, in particular the use of special filter elements having a "water lock" as well as a delivery line and an air-bleed line on the filter chamber, and the entire filter vessel has to be designed so that it can withstand the overpressure. Despite that, even with this solution, only a small part of the energy employed can be utilized to accelerate the flushing medium, since an overpressure first has to be generated in the entire vessel, but only the overpressure built up in the plenum serves for accelerating the flushing medium. Finally, here too, only the pressure difference between the plenum and filter chamber which occurs as a result of the flow resistance in the filter elements can be employed in order to accelerate the flushing medium. However, in view of the time required for the escape of the compressed air from the filter chamber and the filter elements, the pressure in the filter chamber can drop only slowly, whilst at the same time the introduced flushing medium begins to flow off. On the other hand, since the flow resistance in the filter elements has to be relatively low for the purpose of filtration, as a rule only a relatively small pressure difference, for example 0.1 bar at most, can build up, and that only within several seconds. The introduced quantity of flushing medium can therefore flow off completely or substantially, before the desired driving force for accelerating the flushing medium is obtained.

The object on which the present invention is based is to provide a simpler cleaning method which can be carried out with as few changes to the apparatus as possible and which, moreover, allows an even more effective cleaning than the abovementioned method.

To achieve this object, the invention proposes a cleaning process according to the appended claims which allows a simpler and more effective cleaning of deposit filters having filter elements installed in a suspended manner.

The knowledge that the maximum speed of the flushing medium need be maintained for only a very short time is crucial for the process according to the invention. Lengthening the flushing period beyond a particular value increases the cleaning effect only marginally, but needlessly increases the consumption of flushing medium. Furthermore, the process according to the invention is based on the knowledge that the lower permeability of the filter elements can be utilized at the end of the working cycle in order to simplify the cleaning process.

At the start of the cleaning process according to the invention, the space available in the plenum is filled with the flushing medium completely or almost completely (for example, at at least 90%). This can be supplied, for example, by way of the filtrate flow-off line, by way of the feed line for the liquid to be filtered or by way of a separate line. Preferably, there can be arranged on the plenum air-bleed connection, by way of which any air present in the plenum can be discharged. If the filtrate is used for cleaning, the filtrate quantity present in the plenum at the end of a work cycle can serve directly as a flushing medium.

The quantity of flushing medium required for cleaning can vary according to the deposit filter and the contamination and can amount, for example, to approximately 5–20 l per $m^2$ of filter surface. If desired, a displacement body can be accommodated in the plenum, if a specific volume of flushing medium smaller than the volume of the plenum is to be introduced.

In the first step of the process according to the invention, as in the process described in U.S. Pat. No. 5,017,241, the liquid present in the filter chamber is discharged completely or partially by opening the emptying line and a ventilating line. In the previously known process, however, the plenum is ventilated and the liquid introduced in the plenum flows off by way of the filter elements with the exception of a residual quantity defined by the water locks on the filter elements. In contrast, in the process according to the invention, a ventilation of the plenum and a flow-off of flushing medium are to be avoided or kept as low as possible.

This is achieved, according to the invention, in that the ventilation takes place by way of a ventilating line opening into the uppermost region of the filter chamber. The air can thus flow directly into the filter chamber and thereby allows a rapid discharge of liquid from the filter chamber. In contrast, air can penetrate into the plenum by way of the filter elements only comparatively slowly. As a result of the lower permeability of the filter elements with their filter cake, which is present after a work cycle, the passage of air is additionally retarded. Since the discharge of liquid from the filter chamber takes place comparatively quickly, therefore, even when conventional filter elements are used, only a small quantity of air can penetrate into the plenum and does not impair the effectiveness of the process.

The cleaning process according to the invention is consequently suitable for deposit filters having conventional filter elements. However, it is suitable especially also for deposit filters which have filter elements provided with a "water lock", as described in U.S. Pat. No. 5,017,241. But, in the present process, the "water lock" does not serve for introducing a specific quantity of liquid in the plenum, but it can retain small quantities of air, which can possibly penetrate into the filter elements, and therefore prevent them from penetrating into the plenum.

However, in order to avoid air penetrating accidentally into the plenum, it is preferable to use filter elements which are gas-impermeable in their upper region located within the filter chamber. For example, the filter elements can have a gas-impermeable filter-element connection which is fastened in the corresponding orifice of the filter plate. If such filter elements are used, expediently at most so much liquid should be discharged from the filter chamber that the height of the air layer formed in the filter chamber corresponds to the length of the gas-impermeable region of the filter elements.

In the first step of the process according to the invention, however, preferably at least so much liquid will be discharged from the filter chamber that there forms in the filter chamber an air layer, the volume of which is at least approximately half as large as the volume of the flushing medium introduced in the plenum. If the air volume is at least approximately equal to the volume of flushing medium, then a damping of the subsequent pressure surge is avoided completely or substantially. If the air volume is smaller than the volume of flushing medium, then, although some damping of the pressure surge is brought about, the cleaning off in the upper region of the filter elements can nevertheless at the same time be improved, if desired.

In order to improve the effect of the subsequent pressure surge, after the complete or partial discharge of the liquid from the filter chamber the ventilating valve assembly can preferably be closed and an underpressure generated in the filter chamber. This can be achieved, for example, in that the filter chamber or preferably the emptying line is connected to an external vacuum system, for example a vacuum assembly or an existing vacuum network. Furthermore, if the liquid present in the filter chamber has been discharged only partially, the liquid remaining in the filter chamber and in the emptying line can be utilized for generating a partial vacuum, for example by a barometric arrangement of the emptying line.

After the discharge of liquid from the filter chamber, the emptying valve assembly and the ventilating valve assembly can be closed or remain open. However, if the liquid is to be discharged only partially, the flow-off is expediently stopped by closing the emptying valve assembly and/or the ventilating valve assembly, preferably by closing the ventilating line. If a partial vacuum is to be generated in the filter chamber, the ventilating valve assembly is expediently closed beforehand; the emptying valve assembly has to be closed only when the underpressure is generated by way of a separate line; however, it remains opened especially when the emptying line is connected to a vacuum system or liquid remaining in the filter chamber and in the emptying line is utilized for generating the underpressure.

After the discharge of liquid from the filter chamber and, if appropriate, after the generation of an underpressure in the filter chamber, a pressure surge is generated in the plenum and drives the flushing medium through the filter elements at high speed (flushing surge). This is achieved, according to the invention, by briefly opening the valve assembly of a pressure-generating line which is arranged on the plenum and by way of which propellent gas or flushing medium under pressure is conveyed into the plenum. Pressure generation can take place preferably by means of pressurized gas, especially compressed air, from an external vessel. In general, a pressure of approximately 2 to 6 bar is sufficient. If a propellent gas is used, the magnitude of the pressure and the period during which pressure is exerted are preferably calculated so that they are just sufficient to drive the quantity of flushing medium introduced in the plenum through the filter elements. In order to allow a brief and controlled period of the pressure surge, the pressure generation is preferably regulated by means of a quick-switching valve assembly, for example by means of a ballcock with a drive which can be opened by rotating the ball in a continuous movement through 180° and which can be closed again in the same way.

The cleaning effect is approximately proportional to the flow speed of the flushing medium. Flushing medium which is not forced through the filter elements at the maximum speed is therefore lost more or less uselessly. The process according to the invention allows a very rapid, virtually instantaneous pressure build-up, and this pressure is maintained only briefly, as a result of which an optimum cleaning effect can be achieved. The more air there is present in the plenum, the more sharply the flushing surge is damped. It is therefore necessary to avoid having relatively large quantities of air in the plenum before the flushing surge. In contrast, small air quantities, for example up to approximately 10% of the plenum content, damp the flushing surge only insignificantly and therefore scarcely impair the cleaning effect. Since the plenum is filled with flushing medium completely or almost completely at the beginning, and during the first process step air cannot penetrate into the plenum or can only penetrate very slowly, a virtually optimum cleaning effect can be achieved in the process according to the invention.

In the process according to U.S. Pat. No. 5,017,241, however, the driving force builds up only comparatively slowly because of the outflow of compressed air from the filter chamber, and subsequently it decreases continuously again as a result of the decreasing pressure difference. Further disadvantages of this process are that, first of all, an overpressure also has to be generated in the filter chamber and the filter vessel must withstand the pressure of the propellent gas. In contrast, in the process according to the invention, a pressure surge is generated only in the plenum, and by means of the pressure-generating valve assembly the pressure drops to the flow resistance through the filter elements. In view of the large filter surface, this resistance is below 1 bar and therefore always below the design pressure of the filter vessel.

Finally, in the last step of the process according to the invention, the impurities and the liquid are discharged by way of the emptying line, with the emptying valve assembly opened and with the ventilating valve assembly opened.

If desired, the cleaning described can be repeated once or several times by means of a flushing surge. If the pressure surge takes place as a result of the introduction of flushing medium under pressure, this can be carried out in a simple way in that, after the pressure surge has taken place, the pressure-generating valve assembly is briefly opened once again, since the plenum remains filled with flushing medium completely or virtually completely. If propellent gas is used, this can preferably take place in that the filter vessel is filled once again with flushing medium, before or after the discharge, and the cleaning process is repeated.

The invention likewise relates to a deposit filter for carrying out the cleaning process according to the invention. Its mode of operation and preferred embodiments emerge from the explanations given above. It differs from the conventional deposit filters mainly in the ventilating line opening into the uppermost region of the filter chamber and in the manner in which the emptying valve assembly, the ventilating valve assembly and the pressure-generating valve assembly are switched in succession during the cleaning operation.

The drawing shows a diagrammatic representation of a preferred deposit filter. The filter vessel 1 is subdivided by a filter plate 10 into a lower filter chamber (dirt space) 2 and an upper plenum (clean space) 3. Arranged vertically in the filter chamber 2 is a plurality of filter elements 4 which are fastened in corresponding orifices of the filter plate 10 by means of a gas-impermeable filter-element connection 5; for the sake of a simpler representation, only one filter element is shown in the drawing. For filtration, the liquid to be filtered is conveyed into the filter chamber 2 by way of a feed line 14, and the filtrate is discharged from the plenum 3 by way of a filtrate flow-off line 16. The feed line 14 and the flow-off line 16 are each provided with a valve assembly 15 and 17, and these are opened during filtration and closed during cleaning. During filtration or during filling with flushing medium, the plenum 3 can, if necessary, be bled of air by way of an air-bleed connection 18 provided with a valve assembly 19 for opening and closing. For carrying out the cleaning, three lines, each with a valve assembly for opening and closing, are provided and are switched in the way described above, they are namely a ventilating connection 6 arranged in the uppermost region of the filter chamber 2 and having a ventilating valve assembly 11, an emptying line 7 arranged in the bottom of the filter vessel 1 and having an emptying valve assembly 12, and a propellent-gas feed line 8 arranged on the plenum 3 and having a pressure-generating valve assembly 13 designed here as a ballcock. The propellent-gas line 8 is connected to a propellent-gas pressure vessel 9. The flushing medium can, for example, be supplied by way of the feed line 14, with the filtrate flow-off valve assembly 17 opened, or the filtrate present in the plenum 3 at the end of a work cycle can preferably serve as a flushing medium. For cleaning, first the emptying valve assembly 12 and the ventilating valve assembly 11 are opened, in order to cause liquid to flow off from the filter chamber 2. The ventilating valve assembly 11 is preferably closed again before the height of the air layer formed in the filter chamber 2 has reached the height of the filter-element connections 5, in order as completely as possible to prevent the passage of air into the plenum 3. The closing of the ventilating valve assembly 11 (with the emptying valve assembly 12 opened) brings about a partial vacuum in the filter chamber 2. By subsequently opening the pressure-generating valve assembly 13 briefly, the flushing medium is forced into the filter chamber through the filter elements 4, and thereafter, by opening the ventilating valve assembly 11, the filter cake and any deposit promoters are discharged, together with the liquid, by way of the emptying line.

For a better understanding, the cleaning method according to the invention is further illustrated below by means of two typical examples, with an indication of the average time spans and the respective settings of the ventilating valve assembly 11, emptying valve assembly 12 and pressure-generating valve assembly 13. However, at all events, the duration of the individual steps should be matched to the geometry of the respective deposit filter and coordinated with one another in the most effective possible way. The time spans indicated can therefore give at most a rough guideline and are in no way to be understood in the sense of a restriction.

EXAMPLE 1

Cleaning method with the generation of an underpressure in the filter chamber:

| | Typical duration (sec) | Valve assembly 11 | 12 | 13 |
|---|---|---|---|---|
| A) Initial position with air-bled filter vessel filled with liquid after the end of a work cycle | | closed | closed | closed |
| B) Partially empty the filter chamber | 10 | open | open | closed |
| C) Buildup an underpressure in the filter chamber | 2 | closed | open | closed |
| D) Flushing surge | 1 | closed | open | open |
| E) Discharge | 30 | open | open | closed |

EXAMPLE 2

Cleaning method without the generation of an underpressure in the filter chamber:

| | Typical duration (sec) | Valve assembly 11 | 12 | 13 |
|---|---|---|---|---|
| A) Initial position with air-bled filter vessel filled with liquid after the end of a work cycle | | closed | closed | closed |
| B) Partially empty the filter chamber | 12 | open | open | closed |
| C) Flushing surge | 1 | open | open | open |
| D) Discharge | 30 | open | open | closed |

We claim:

1. Process for the cleaning of a deposit filter comprising a filter vessel (1), a filter plate (10) with orifices, a ventilating line (6) with ventilating valve assembly (11), an emptying line (7) with emptying valve assembly (12) and a pressure-generating line (8) with valve assembly (13), said deposit filter being subdivided by said filter plate (10), arranged horizontally in the filter vessel (1), into an upper plenum (3) and a lower filter chamber (2), said deposit filter having, in the filter chamber (2), vertically arranged filter elements (4) fastened in said orifices in the filter plate (10), said plenum (3) being filled, at the start of the cleaning process, completely or almost completely with a liquid which serves as a flushing medium, and said cleaning process comprising a) first, discharging completely or partially the quantity of liquid present in the filter chamber (2) by opening the ventilating valve assembly (11) of the ventilating line (6) opening into the uppermost region of the filter chamber (2) and by opening the emptying valve assembly (12) of the emptying line (7) arranged in the bottom of the filter vessel (1), b) closing the ventilating valve assembly (11) and generating an underpressure in the filter chamber (2), c) then, by briefly opening the valve assembly (13) of the pressure-generating line (8) which is arranged on the plenum (3) and by way of which propellent gas or flushing medium under pressure is conveyed into the plenum (3), generating a pressure surge in the plenum (3) and driving the flushing medium through the filter elements (4), and d) discharging, with the ventilating valve assembly (11) opened and the emptying valve assembly (12) opened, impurities and the liquid from the filter chamber (2).

2. Process according to claim 1, wherein the duration of the pressure surge is regulated by means of a quick-switching valve assembly (13).

3. Process according to claim 2, wherein the quick-switching valve assembly is a ballcock with a drive which opens and closes the ballcock in a continuous movement through 180°.

4. Process according to claim 1, wherein the pressure generation takes place by means of propellent gas and is calculated in terms of duration and pressure in such a way that it is just sufficient to drive the quantity of flushing medium introduced in the plenum (3) through the filter elements.

5. Process according to claim 1, wherein the pressure generation takes place by means of pressurized gas from an external vessel (9).

6. Process according to claim 1, wherein the underpressure is generated by means of an external vacuum system which is connected to the filter chamber (2) or to the emptying line (7).

7. Process according to claim 1, wherein the liquid present in the filter chamber (2) is discharged only partially, and the liquid remaining in the filter chamber (2) and in the emptying line (7) is utilized for generating the underpressure.

8. Process according to claim 7, wherein the filter elements (4) have a gas-impermeable upper region (5) located within the filter chamber (2), and at most so much liquid is discharged from the filter chamber (2) that the height of the air layer formed corresponds to the length of the gas-impermeable region (5) of the filter elements (4).

9. Process according to claim 7, wherein the underpressure is generated as a result of a barometric arrangement of the emptying line.

10. Process according to claim 1, wherein, in the first process step, at least so much liquid is discharged from the filter chamber (2) that the volume of the air layer formed in the filter chamber (2) is at least half as large as the volume of the flushing medium introduced in the plenum (3).

11. Process according to claim 1, wherein the filtrate serves as a flushing medium.

12. Process according to claim 1, wherein 5–20 l of flushing medium per $m^2$ of filter surface are used.

13. Process according to claim 1, wherein, to accelerate the emptying of the filter chamber (2), a propellent gas is introduced under a higher pressure through the ventilating line (6) and the ventilating valve assembly (11).

* * * * *